US008102764B2

(12) United States Patent
Castelli et al.

(10) Patent No.: US 8,102,764 B2
(45) Date of Patent: Jan. 24, 2012

(54) METHOD AND SYSTEM FOR PERFORMANCE EVALUATION IN COMMUNICATION NETWORKS, RELATED NETWORK AND COMPUTER PROGRAM PRODUCT THEREFOR

(75) Inventors: Paolo Castelli, Turin (IT); Maurizio Bartoli, Turin (IT)

(73) Assignee: Telecom Italia S.p.A., Milan (IT)

( * ) Notice: Subject to any disclaimer, the term of this patent is extended or adjusted under 35 U.S.C. 154(b) by 1427 days.

(21) Appl. No.: 11/630,882

(22) PCT Filed: Jun. 30, 2004

(86) PCT No.: PCT/EP2004/007103
§ 371 (c)(1),
(2), (4) Date: Dec. 27, 2006

(87) PCT Pub. No.: WO2006/002664
PCT Pub. Date: Jan. 12, 2006

(65) Prior Publication Data
US 2008/0034086 A1    Feb. 7, 2008

(51) Int. Cl.
*H04J 1/16* (2006.01)
(52) U.S. Cl. ............... 370/230.1; 370/229; 370/230; 370/414; 370/417
(58) Field of Classification Search ............. 370/412, 370/229, 230, 230.1, 414, 417
See application file for complete search history.

(56) References Cited

U.S. PATENT DOCUMENTS

| | | | | |
|---|---|---|---|---|
| 5,381,404 A * | 1/1995 | Sugano et al. | | 370/238 |
| 5,883,819 A | 3/1999 | Abu-Amara et al. | | |
| 5,917,822 A * | 6/1999 | Lyles et al. | | 370/395.4 |
| 6,438,135 B1 * | 8/2002 | Tzeng | | 370/412 |
| 6,567,415 B1 * | 5/2003 | Elwalid et al. | | 370/412 |
| 6,657,960 B1 * | 12/2003 | Jeffries et al. | | 370/230.1 |
| 6,748,433 B1 | 6/2004 | Yaakov | | |
| 6,768,744 B1 * | 7/2004 | Kumaran et al. | | 370/412 |
| 7,054,267 B2 * | 5/2006 | Ramanan et al. | | 370/229 |
| 7,142,513 B2 * | 11/2006 | Sun et al. | | 370/232 |
| 7,209,437 B1 * | 4/2007 | Hodgkinson et al. | | 370/230 |
| 7,356,631 B2 * | 4/2008 | Lin | | 710/243 |
| 7,447,229 B2 * | 11/2008 | Regnier et al. | | 370/439 |
| 7,768,910 B2 * | 8/2010 | Neidhardt et al. | | 370/230 |
| 2002/0198995 A1 * | 12/2002 | Liu et al. | | 709/226 |

(Continued)

OTHER PUBLICATIONS

Ferguenson; ("Weighted Processor Sharing Result Hyperexponential Servers"); 1983; p. 1-5.*

(Continued)

*Primary Examiner* — Gary Mui
*Assistant Examiner* — Dewanda Samuel
(74) *Attorney, Agent, or Firm* — Finnegan, Henderson, Farabow, Garrett & Dunner, L.L.P.

(57) ABSTRACT

A system for evaluating performance of a network providing communication services by means of a generalized processor sharing packet scheduling discipline. The services may include classes of services having real time and non real time (i.e. "elastic") requirements, respectively, and the classes of services have relative priorities. The system includes a performance evaluation module configured for evaluating performance of a given class of services as a function of the load produced by other classes of services having a priority higher than or equal to the given class as well as of perturbation effect exerted on the given class by other classes having priority higher than the given class, and a computation module configured for determining the load and the perturbation effect as weighed sums of the contributions of each of the other classes to the load and the perturbation effect.

24 Claims, 8 Drawing Sheets

U.S. PATENT DOCUMENTS

Figure 1:
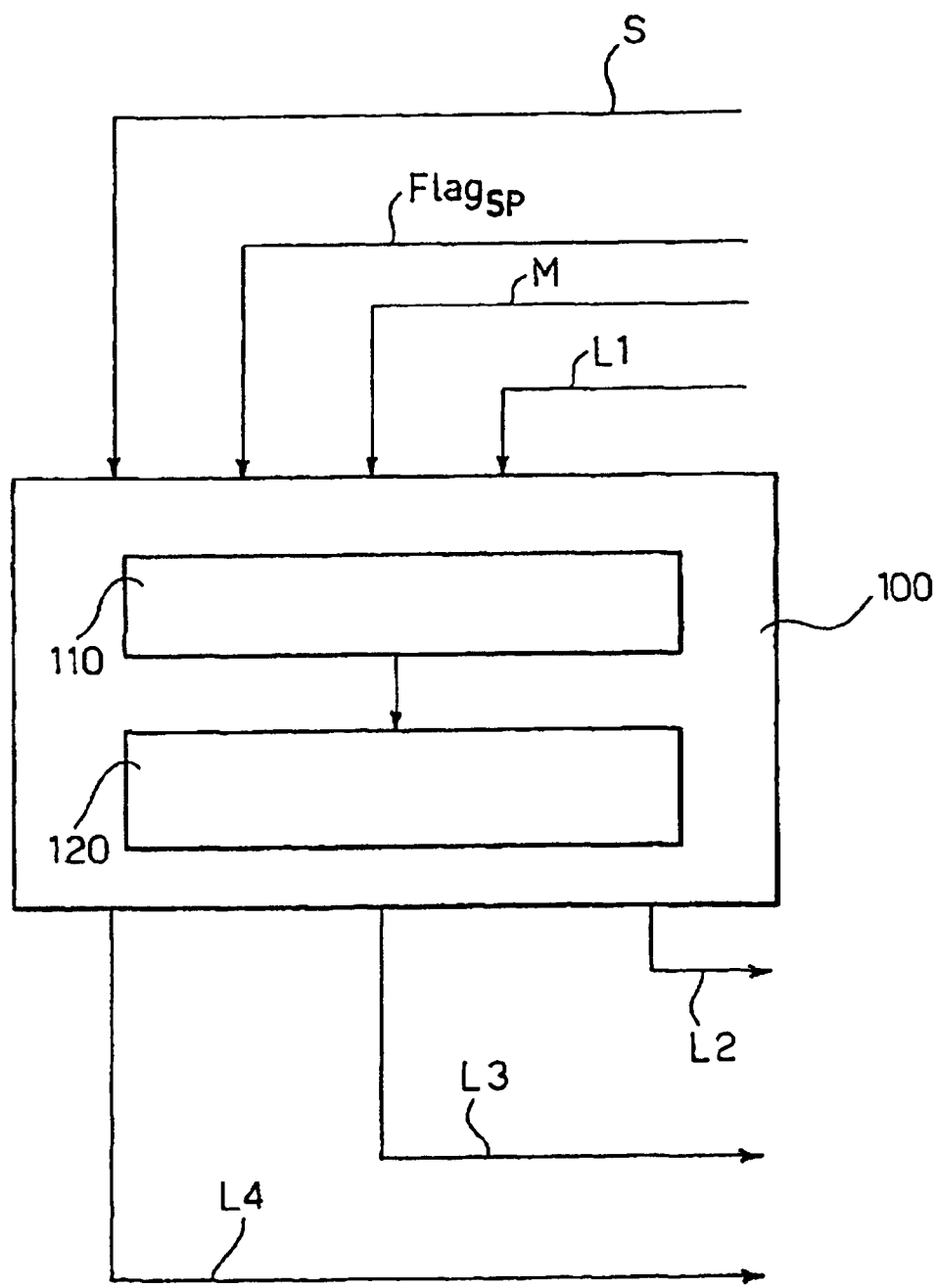

2004/0017804 A1* 1/2004 Vishnu .......................... 370/386
2005/0052997 A1* 3/2005 Montes Linares ............ 370/230

OTHER PUBLICATIONS

Cassandras et al.; (("Marked/Phantom Slot Algorithm for a Class of Scheduling Problems"); 1992; pp. 1-6).*

Kumaran, et al., "Novel Techniques for the Design and Control of Generalized Processor Sharing Schedulers for Multiple QoS Classes", IEEE INFOCOM, ISBN: 0-7803-5880-5, pp. 932-941, (Mar. 26, 2000).

Elwalid, et al., "Design of Generalized Processor Sharing Schedulers Which Statistically Multiplex Heterogeneous QoS Classes", IEEE INFOCOM, ISBN: 0-7803-5417-6, pp. 1220-1230, (Mar. 21, 1999).

Marsan, et al., "A Simulation Analysis of a QoS-Based CAC Algorithm for ATM Networks", XP-002309303, pp. 65/1-65/12, (1997).

Parekh, et al., "A Generalized Processor Sharing Approach to Flow Control in Integrated Services Networks—The Multiple Node Case", IEEE Comp. Soc. Press, XP010032226, pp. 521-530, (Mar. 28, 1993).

Kleinrock, "The Round-Robin Scheduling Algorithm", Queueing Systems, vol. 2, J. Wiley & Sons, pp. 166-170, (1975).

Bonald, et al., "Performance of Bandwith Sharing Mechanisms for Service Differentiation in the Internet", Proceedings of 13 ITC Specialist Seminar, pp. 22-1-22-10, (Sep. 2000).

Borst, et al., "Reduced-Load Equivalence and Induced Burstiness in GPS Queues with Long-Tailed Traffic Flows", Queueing Systems, vol. 43, No. 4, pp. 1-56, (Apr. 2003).

* cited by examiner

Fig_1

Fig. 2
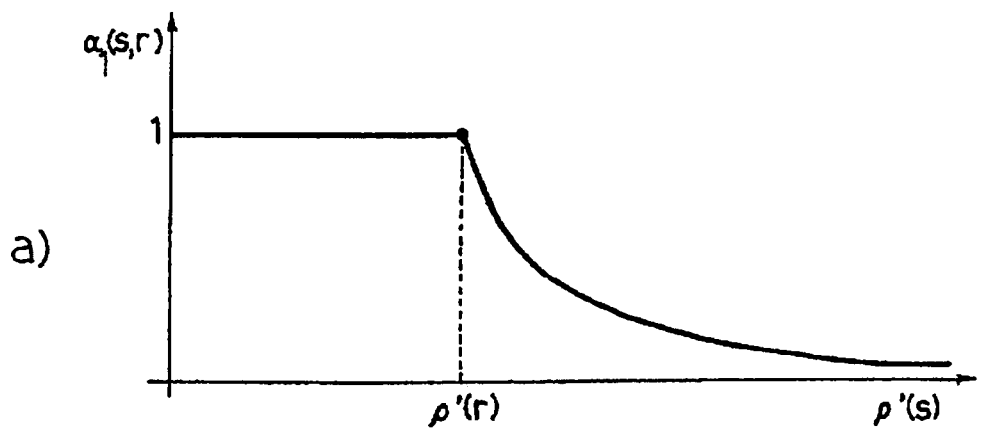
a)
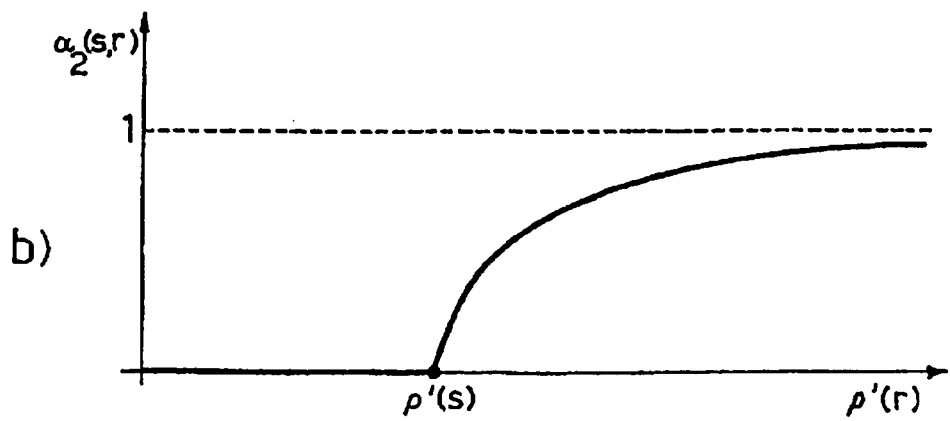
b)

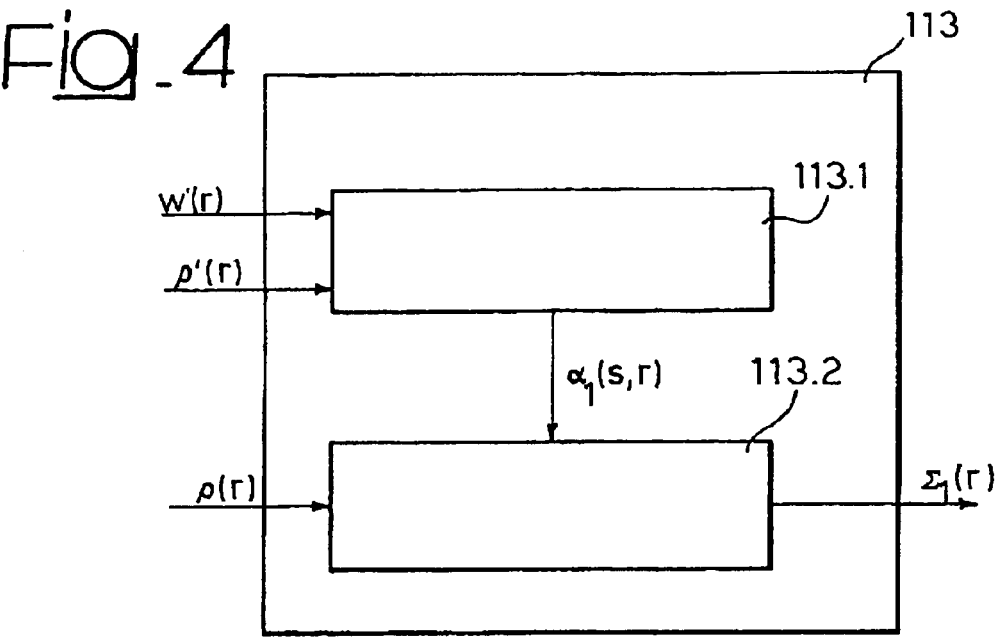
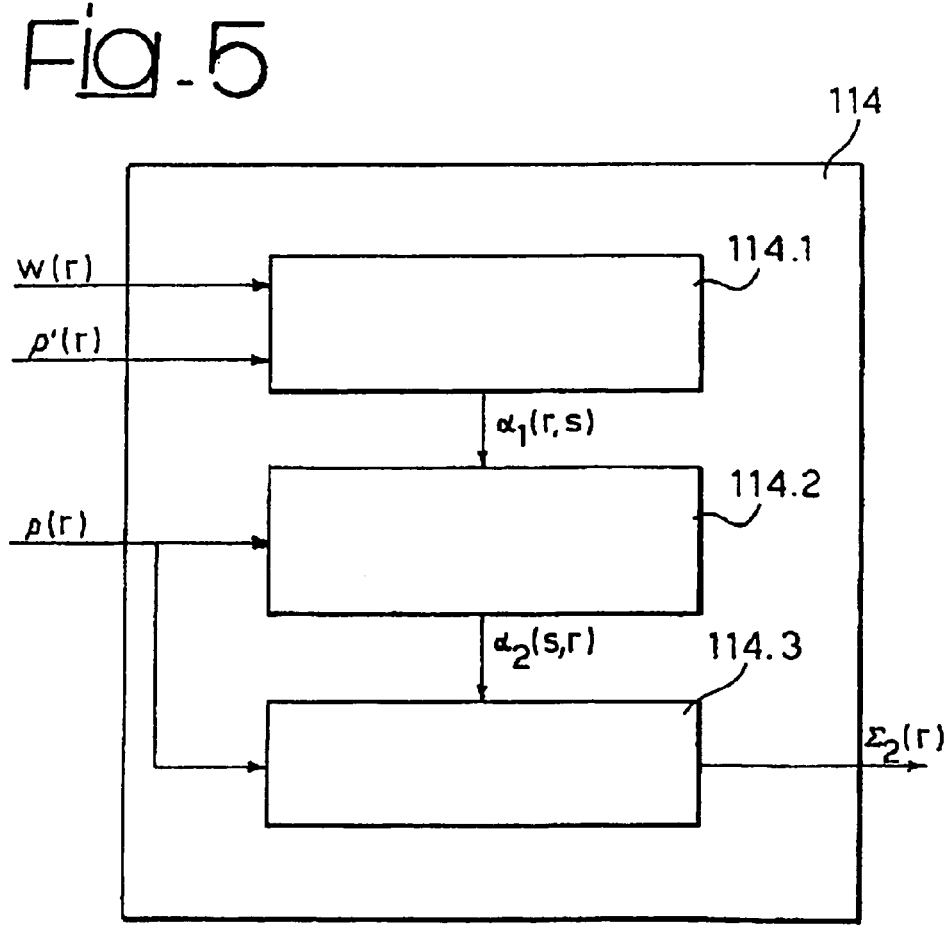

Fig_7

METHOD AND SYSTEM FOR PERFORMANCE EVALUATION IN COMMUNICATION NETWORKS, RELATED NETWORK AND COMPUTER PROGRAM PRODUCT THEREFOR

CROSS REFERENCE TO RELATED APPLICATION

This application is a national phase application based on PCT/EP2004/007103, filed Jun. 30, 2004, the content of which is incorporated herein by reference.

FIELD OF THE INVENTION

The invention relates to performance evaluation in communication networks.

The invention is advantageously applicable to performance evaluation in multi-service packet switched networks with Quality of Service (QoS) differentiation. A specific feature of these networks lies in that the different services supported by the network are grouped in a limited set of Classes of Service (CoS), depending on their QoS requirements.

Advanced packet scheduling mechanisms—generally in the form of Generalized Processor Sharing (GPS) mechanisms—are used within the network devices to ensure that data flows belonging to different classes of service are handled with different levels of priority and experience different levels of QoS. Nowadays, a typical example of this type of networks is represented by Differentiated Services (DiffServ) IP networks.

The different scheduling mechanisms adopted within these networks, such as Weighted Fair Queuing (WFQ), Deficit Round Robin (DRR) and Modified Deficit Round Robin (MDRR), are examples of GPS-based mechanisms.

However, the field of applicability of the invention is not limited to this type of networks and extends more generally to any kind of packet switched network based on GPS-like scheduling mechanisms.

DESCRIPTION OF THE RELATED ART

Analytical methods (as opposed to simulation and methods based on direct measurements) provide a fast, flexible and cost effective approach to network performance evaluation. This approach can be adopted during the network design phase for predictive performance analysis finalized to network dimensioning and "what if" analysis. The same approach can also be applied during actual operation of the network for real time performance estimation based on indirect measurements.

The intrinsic complexity of multi-service networks makes the exact solution of the analysis problem unfeasible; therefore, only approximated approaches are possible.

Two aspects of the problem are particularly significant:
  i) performance evaluation should be performed at different levels, depending on the type of service;
  ii) the complex behavior of a GPS-like mechanism is difficult to model under general traffic assumptions.

Concerning the former aspect, services with real time requirements are to be distinguished from so-called "elastic" (i.e., best effort) data services.

Real time services (e.g., voice and video transmission services) do indeed require that each packet be received with low delay and delay jitter. As a consequence, performance for these services is properly evaluated at the packet level, in terms of average and maximum packet delay.

Elastic services, on the contrary, are sensitive to the total time required to receive an application level data unit (e.g., a file, a web page) while being essentially insensitive to the delay experienced by each packet. As a consequence, performance for these services is more properly evaluated at the application level in terms of average throughput available for each individual transmission.

Concerning the latter aspect, GPS-like mechanisms serve different traffic aggregates in parallel and control the quota of capacity guaranteed to each flow through pre-assigned weights. By modifying the weights associated to each flow, it is possible to control the capability of each flow to exploit the server capacity and, finally, the service speed perceived by each flow. In practice, a GPS mechanism operates as a priority-based server where the relative priorities of the different traffic aggregates can be varied in a continuous manner. This is in contrast with a classical, absolute priority server approach, where only three states are possible: lower, equal or higher priority.

This flexibility renders GPS-like mechanisms a powerful tool in guaranteeing different levels of service to the different classes. As indicated, GPS-like mechanisms are however extremely difficult to model.

A basic reference textbook such as L. Kleinrock: "Queueing Systems" Volume 1 and Volume 2; J. Wiley & Sons, 1975 provides a quite exhaustive explanation of queuing theory and includes the analysis of a large number of queuing systems; specifically, Volume 2 includes at pages 166-170 the analysis of Processor Sharing (PS) systems. While giving the expression for the average transmission time in a M/G/1-PS system without priorities, GPS systems are not addressed directly.

The article "Performance of Bandwidth Sharing Mechanisms for Service Differentiation in the Internet" by T. Bonald and J. W. Roberts; Proceedings of 13 ITC Specialist Seminar, September 2000, focuses on GPS systems from the viewpoint of "elastic" services only. Therefore, only the average throughput is evaluated. In addition, this article basically approximates a GPS system by means of a system with absolute preemptive priorities and derives upper and lower bounds for the average throughput in a GPS system; these bounds, however tend to be excessively approximated in general load conditions.

The article "Reduced-Load Equivalence and Induced Burstiness in GPS Queues with Long-Tailed Traffic Flows" by S. Borst, et al., Queueing Systems, Vol. 43, N. 4; April 2003, is one of many papers exploiting the so-called Large Deviation Theory to derive the asymptotic behavior of GPS systems under a variety of assumptions about the distribution of the flow length (exponential distribution, heavy tailed distribution etc.). This approach is oriented to the evaluation of the packet loss probability rather than to the characterization of delay and is therefore of little relevance for performance evaluation as intended in the present context.

Finally, U.S. Pat. No. 5,883,819 describes a method for QoS assessment in a multimedia communication network. The method described was developed in an ATM network context with either full sharing of the transmission capacity by the different CoS or a complete segregation of the different CoS. Therefore, the method described in U.S. Pat. No. 5,883,819 is not adapted to be applied successfully in the context of the invention.

In practice, no arrangement is available in the art that permits an integrated evaluation of performance as experienced e.g. by the two types of service (real time and "elastic" services) identified above in the context of GPS-based networks. Approximated solutions focusing either on real time services or on elastic services are available. However, these prior art solutions approximate the behavior of the GPS mechanism with the behavior of an absolute priority mechanism, which causes most of the peculiarities of these mechanisms to be lost.

OBJECT AND SUMMARY OF THE INVENTION

The need therefore exists of providing an arrangement adapted to overcome the intrinsic drawbacks of the prior art considered in the foregoing by providing a general approach for evaluating the behavior of GPS-like mechanisms.

According to the present invention, that object is achieved by means of a method having the features set forth in the claims that follow. The invention also relates to a corresponding system, a related network as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

The arrangement described herein is essentially based on a modification of the arrangements used heretofore for taking into account the effect of the load offered by the different CoS on the performances experienced by a given CoS. More to the point, the modification is based on the introduction of specific weighting factors that account for the relative priority of the different CoS.

Preferably, the arrangement described herein applies such an approach to different procedures adapted for performance evaluation of real time and elastic services, respectively. The procedures in question can be integrated to a common procedure for evaluating the performances perceived by the whole of the different CoS sharing the capacity of a common server. The arrangement described herein can thus be applied in evaluating network performance as experienced by the different CoS (real time CoS as well as elastic CoS) at any network device where packet buffering and scheduling are performed. Exemplary of such devices are the input and/or output interfaces of network switches, routers or multiplexers.

The arrangement described herein is applicable to any number and/or combination of real time and elastic CoS. In order to provide the best results, the arrangement preferably exploits the knowledge of the first and second order statistics of the packet lengths as well as the flow lengths. The arrangement described herein can also be applied, with a greater approximation, when only the first order statistics are known.

The arrangement described herein can be applied directly to the evaluation of performance of a network device subject to a given load. Alternatively, it can be used as the basic building block in an iterative algorithm for link capacity dimensioning. The former application mentioned also includes the utilization of arrangement described herein in a network monitoring system for real time performance evaluation. In addition, the arrangement described herein can be used as a building block for end-to-end performance evaluation within a network.

BRIEF DESCRIPTION OF THE ANNEXED DRAWINGS

Figure 3:
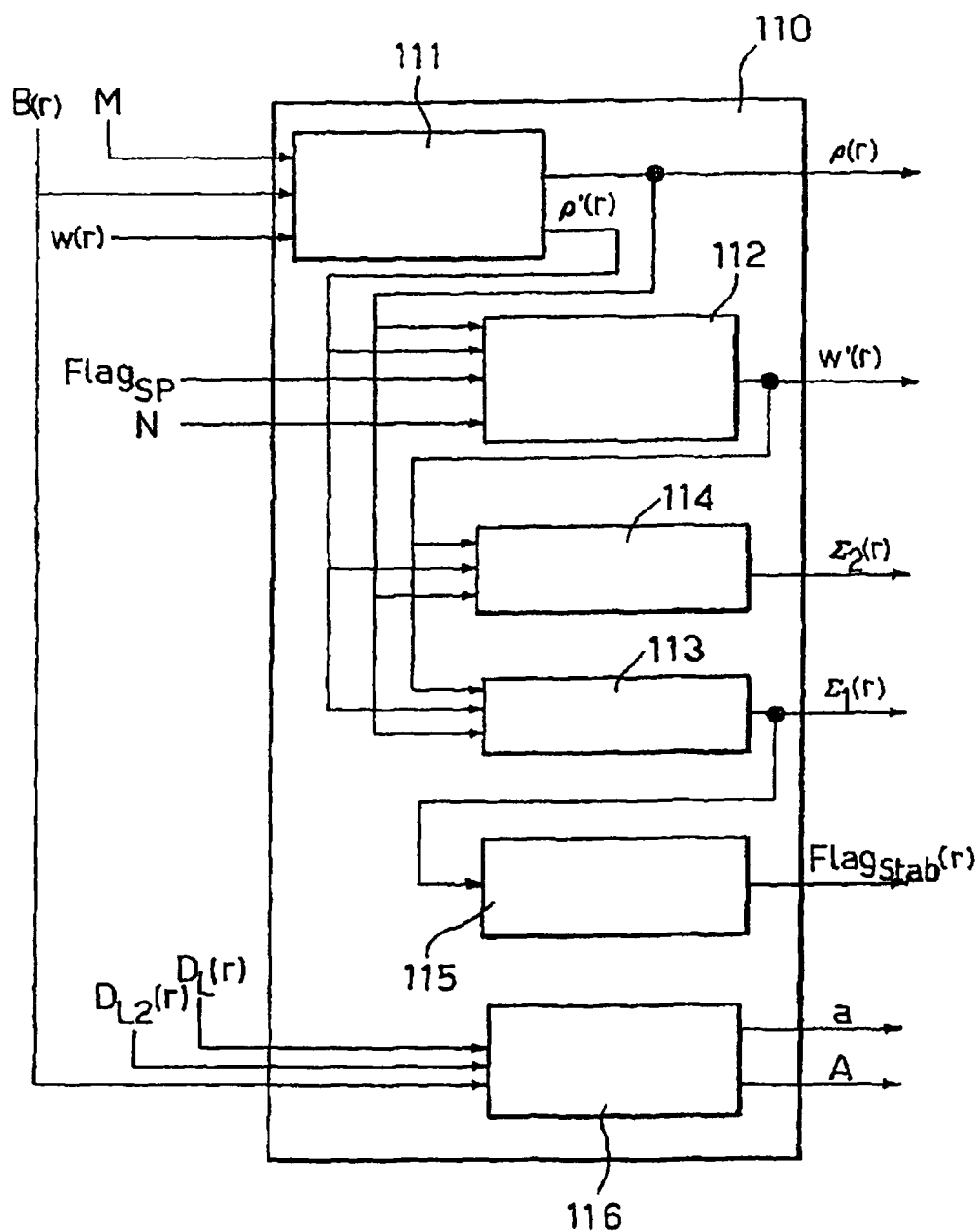
Figure 6:
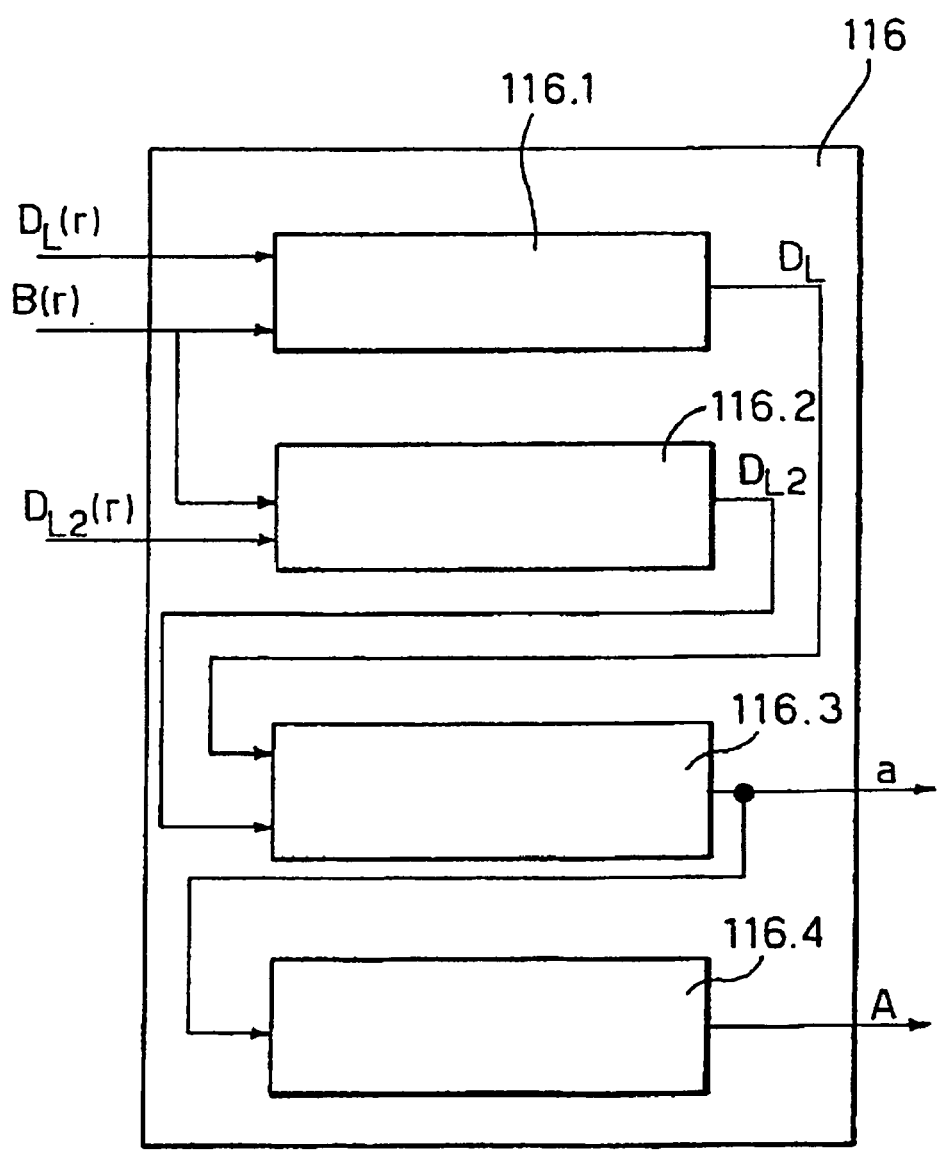
Figure 7:
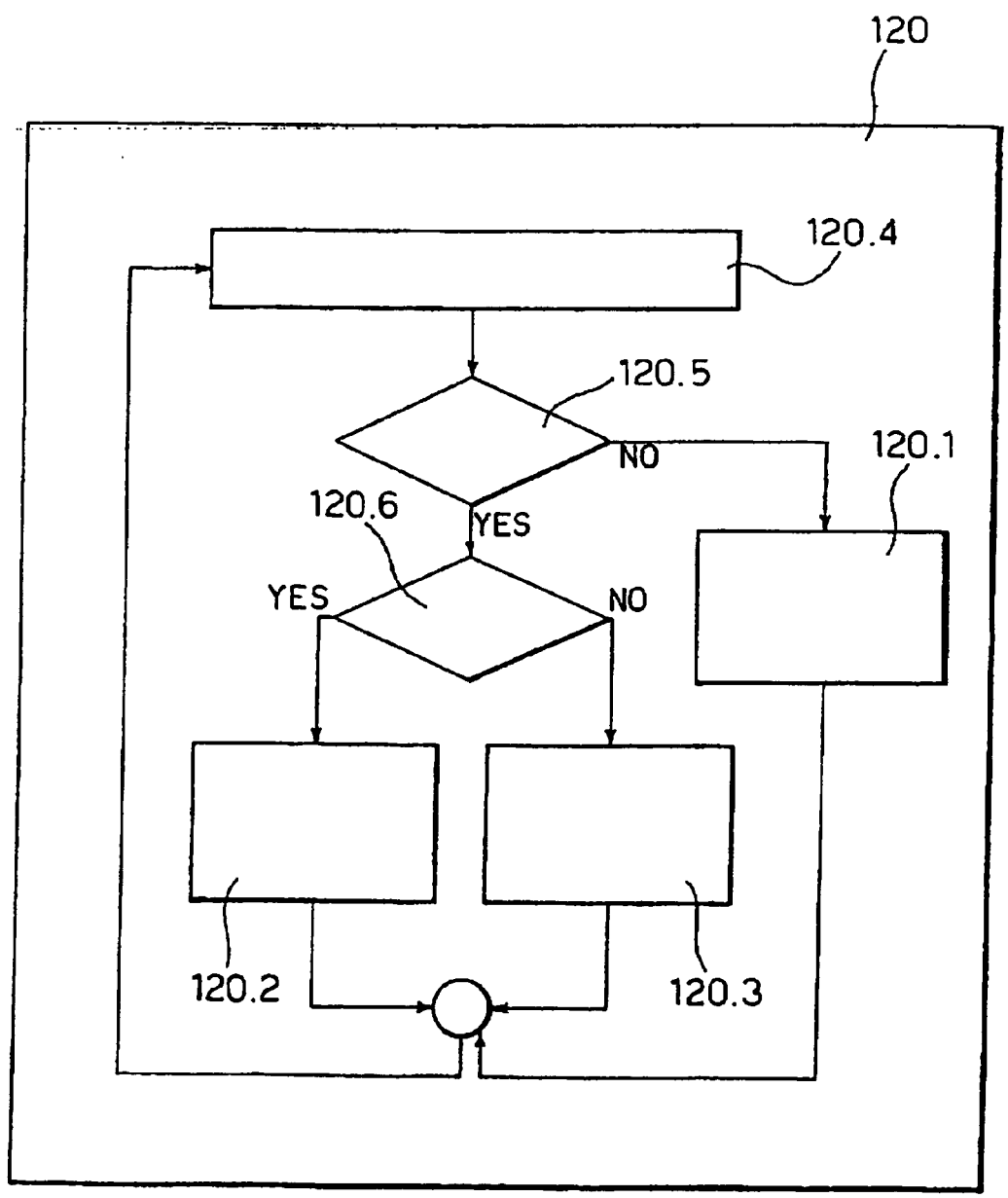

The invention will now be described, by way of example only, with reference to the enclosed figures of drawing, wherein:

FIG. 1 is a high level representation of link performance evaluation within the arrangement described herein, FIG. 2 includes two diagrams, marked a) and b) respectively, representative of the desired behavior of certain weighing factors in the arrangement described herein, FIG. 3 is a block diagram detailing the structure of one of the blocks shown in FIG. 1, FIGS. 4 to 6 are further block diagrams detailing the structures of certain blocks shown in FIG. 3, FIG. 7 is a block diagram detailing the structure of another block shown in FIG. 1, and FIGS. 8 to 10 are additional block diagrams detailing the structures of certain blocks shown in FIG. 7.

DETAILED DESCRIPTION OF PREFERRED EMBODIMENTS OF THE INVENTION

A number of abbreviations used throughout this description are listed below together with their associated meanings:
CoS: Class of Service
DRR: Deficit Round Robin
GPS: Generalized Processor Sharing
MDRR: Modified Deficit Round Robin
PS: Processor Sharing
QoS: Quality of Service
WFQ: Weighted Fair Queuing The exemplary arrangement described herein is primarily intended for use in evaluating the performance experienced by different classes of services (CoS) sharing the capacity of a packet service system/network. Specifically, in the system considered here a scheduling discipline is implemented based on the Generalized Processor Sharing (GPS) algorithm. Hereinafter, such a system will be identified briefly as a "GPS-like" system.

A GPS-like system may represent any input, output or internal interface of a packet-based communication equipment where packets are buffered before being served and the serving discipline implements a GPS-like algorithm. In particular, the GPS-like system may represents an output interface of a DiffServ-based IP router implementing a scheduling discipline based on algorithms such as Weighted Fair Queuing (WFQ), Deficit Round Robin (DRR) or Modified Deficit Round Robin (MDRR).

The exemplary arrangement described herein distinguishes two main types of CoS: those having real time requirements (Real Time CoS) and those exhibiting no real time CoS (Elastic CoS). The arrangement may handle any number of CoS and/or combination of the two types, without restrictions. All CoS are assumed to be handled by the scheduler according to configuration weights, with the only exception of the first class, which can be handled with absolute priority. This feature facilitates the modeling of special schedulers, such as MDRR schedulers, that provide this capability.

The performance parameters considered may differ depending on the type of CoS and depending on whether the CoS is congested or not.

The performance parameters computed for the non-congested real time CoS are:
the average packet delay, i.e. the sum of the average queuing delay and the transmission time,
the maximum packet delay, i.e. the sum of the maximum queuing delay and the transmission time: the maximum queuing delay is intended to be the maximum queuing delay exceeded with probability lower than a given threshold E, i.e., the $\epsilon$-quantile of the queuing delay.

The performance parameters computed for the non congested elastic CoS are:
- the average throughput perceived during the transmission of an application-level data unit (e.g., a web page, an e-mail message, a data file etc.),
- the average transmission time of an application-level data unit of a given length.

The performance parameter computed for the congested CoS (Real Time CoS as well as Elastic CoS) is the fraction of information lost due to congestion (loss probability).

A high level block diagram of the arrangement described herein is shown in FIG. 1, where the inputs and outputs are highlighted together with the main building blocks.

In the exemplary embodiment shown, the inputs to a link performance evaluation block, designated 100, are:

i) a set of parameters S including the number of considered CoS N and the parameters describing the characteristics of each CoS. Each parameter can be represented as a list of N values, where the generic value r refers to CoS r; the relevant parameters considered here are the following:
- the average packet size $P_L(r)$
- average squared packet size $P_{L2}(r)$
- the average document size $D_L(r)$
- the average squared document size $D_{L2}(r)$
- a Real Time flag $Flag_{RT}(r)$: true if CoS r has Real Time requirements
- a threshold value $\epsilon(r)$ for the computation of the maximum packet delay (Real Time CoS only)
- the traffic offered $B(r)$ ii) a Strict Priority flag $Flag_{SP}$: this flag is true if the first CoS shall be handled with strict priority; in that special case the scheduler configuration parameter for this class (w(1)) is unspecified;

iii) the link capacity M;

iv) a list L1 of the values of the scheduler configuration parameters configured on the link, w(r). Without loss of generality, one may assume that the scheduler configuration parameters are expressed in terms of normalized fractions of the link capacity allocated to each CoS: as a consequence, one may assume that:

$$\sum_{i=1}^{r} w(r) = 1 \quad (1)$$

Commercial devices associate different meanings and formats to the scheduler configuration parameters, but the translation from these specific formats into the fraction of link capacity is usually trivial and does not require to be described in detail here.

The outputs from the link performance evaluation block 100 are:

i) a list L2 of the values for:
- the average packet delay (queuing delay and transmission time) $\gamma_{PA}(r)$: these values are significant only for the non congested Real Time CoS;
- the maximum packet delay (queuing delay and transmission time) $\gamma_{PM}(r)$: these values are significant only for the non congested Real Time CoS;

ii) a list L3 of the values for:
- the average throughput $T_A(r)$: these values are significant only for the non congested Elastic CoS;
- the average transmission time $\gamma_{DA}(r)$: these values are significant only for the non congested Elastic CoS; and ii) a list L4 of the values for the traffic loss probabilities $P_{Loss}(r)$: these values are significant only for the congested Real Time as well as Elastic CoS.

The link performance evaluation block 100 is comprised of two main sub-blocks or units 110 and 120.

The (sub)block 110 (to which the roles of weighting factors computation and CoS stability evaluation are allotted) performs the computation of the weighting factors used by the performance evaluation algorithm and evaluate whether the different CoS are congested (unstable) or not. In addition, it performs also the computation of intermediate data as required by the block 120.

The block 120 (which is allotted the role of CoS performance evaluation) implements the performance evaluation algorithms.

The performance evaluation arrangement described herein implements different approaches for real time and for elastic CoS. For both types of CoS, operation of the arrangement described herein is obtained by adapting to the more general case of GPS systems the results available for strict priority systems. The adaptation involves a modified approach in taking into account the effect of the load offered by the different CoS on the performance experienced by a given CoS.

Specifically, the modification is based on the introduction of specific weighting factors to account for the relative priority of the different CoS.

The key aspects of this generalization are the two related concepts of "virtual load" offered by a given CoS and of relative priority between two CoS.

More in detail, the load offered by CoS r can be identified as the ratio between the offered traffic B(r) and the link capacity M:

$$\rho(r) = \frac{B(r)}{M} \quad (2)$$

The virtual load of class r, $\rho'(r)$, is defined as the ratio of its offered load to its associated scheduler weight:

$$\rho'(r) = \frac{\rho(r)}{w(r)} \quad (3)$$

The virtual load of a given class provides an indication of the service level received by that class: the lower the virtual load, the better the received service.

Consequently, the relative priority of class s with respect to class r, x(s, r), can be defined as the ratio between the Virtual Loads of the two classes:

$$x(s, r) = \frac{\rho'(s)}{\rho'(r)} = \frac{\rho(s) \cdot w(r)}{\rho(r) \cdot w(s)} \quad (4)$$

If the value of x(s, r) is lower than 1, then class s has a priority higher than class r; on the contrary, if the value is higher than 1, then class s has a priority lower than class r.

Performance Experienced by Real Time CoS

The performance experienced by the real time CoS is evaluated at the packet level, and is expressed in terms of average and maximum packet delay (including the queuing delay and the transmission time). Each packet is transmitted at the full link speed: therefore, at this level of observation, there is no sharing of the server capacity and the system behaves like a classical M/G/1 (Poisson arrival process, general distribution of service times, single server, infinite buffer) queuing system with absolute non preemptive priorities.

The average packet delay experienced by CoS r in an M/G/1 queuing system with absolute non pre-emptive priorities can be computed as:

$$\gamma_{PA}(r) = \frac{\sum_{s=1}^{N} \rho(s) \cdot P_{L2}(s)/P_L(s)}{2 \cdot M \cdot \left(1 - \sum_r\right) \cdot \left(1 - \sum_{r-1}\right)} + \frac{P_L(r)}{M} \quad (5)$$

where:

$$\sum_r = \sum_{s=1}^{R} \rho(s) \quad (6)$$

$$\sum_{r-1} = \sum_{s=1}^{r-1} \rho(s) \quad (7)$$

$\Sigma_r$ and $\Sigma_{r-1}$ are the two factor that represent the load observed by class s as a result of priorities.

Basically:

$\Sigma_r$ models the fact that only the load produced by those CoS having priority higher than or equal to class r shall be taken into account, $\Sigma_{r-1}$ models the fact that those classes having priority higher than class r have an additional perturbation effect on class r.

The basic improvement introduced consists in modifying the computation of two terms expressed by formulas (6) and (7) in order to take into account the peculiarities of GPS systems. In practice, two weighting factors $\alpha_1(s,r)$ and $\alpha_2(s,r)$ are introduced, so that the contribution of class s to the performance perceived by class r can be varied gradually depending on the relative priority of the two classes.

With this modification, the average packet delay experienced by class r can be computed as:

$$\gamma_{PA}(r) = \frac{\sum_{s=1}^{N} \rho(s) \cdot P_{L2}(s)/P_L(s)}{2 \cdot M \cdot \left(1 - \sum_1(r)\right) \cdot \left(1 - \sum_2(r)\right)} + \frac{P_L(r)}{M} \quad (8)$$

where:

$$\sum_1(r) = \sum_{s=1}^{N} \alpha_1(s, r) \cdot \rho(s) \quad (9)$$

$$\sum_2(r) = \sum_{s=1}^{N} \alpha_2(s, r) \cdot \rho(s) \quad (10)$$

The two summations are computed on the full set of CoS. $\alpha_1(s,r)$ and $\alpha_2(s,r)$ are the two weighting factors computed on the basis of the virtual loads of the two classes.

The two weighting factors can have any functional form, provided that they satisfy the requirements listed below.

Requirements on $\alpha_1(s,r)$, when described as a function of $\rho'(s)$ are:

$\alpha_1(s,r)=1$ for $\rho'(s) \leq \rho'(r)$ (i.e., when class s has priority higher than or equal to class r)

$\alpha_1(s,r)$ shall be monotonously decreasing to 0 with $\rho'(s)$ when $\rho'(s) > \rho'(r)$ (i.e., when class s has priority lower than class r)

$\alpha_1(s,r)$ shall go to zero when $\rho'(s)$ goes to infinite (i.e., when no capacity is allocated to class s), in such a way that the product $\alpha_1(s,r) \cdot \rho(s)$ goes to an asymptotic value $\pi_A(s,r)=w(s)$. The exact value of said asymptotic value depends on the global load, but it is limited by the lower bound w(s) and the upper bound w(s)/[w(s)+w(r)].

Requirement on $\alpha_2(s,r)$, when described as a function of $\rho'(r)$ are:

$\alpha_2(s,r)=0$ for $\rho'(r) \leq \rho'(s)$ (i.e., when class r has priority higher than or equal to class s)

$\alpha_2(s,r)$ shall be monotonously increasing with $\rho'(r)$ when $\rho'(r) > \rho'(s)$ (i.e., when class r has priority lower than class s)

$\alpha_2(s,r)$ shall asymptotically go to 1 when $\rho'(r)$ goes to infinite (i.e., when no capacity is allocated to class r).

In practice, $\alpha_1(s,r)$ and $\alpha_2(s,r)$ should preferably have a behavior similar to the one depicted in FIG. 2 a) and b), respectively.

A possible functional form for $\alpha_1(s,r)$ is, for instance, the exponential expression (11) below, where x(s,r) represents the relative priority of class s with respect to class r as defined by expression (4):

$$\alpha_1(s,r) = \text{Min}\{1, \rho_A(s,r) + (1 - \rho_A(s,r)) \cdot e^{1-x(s,r)}\} \quad (11)$$

An alternative functional form exhibiting all the desired features is the hyperbolic function (12) below:

$$\alpha_1(s, r) = \begin{cases} 1 & \text{if } \rho'(s) \leq \rho'(r) \\ \dfrac{1}{1 + [\rho'(s) - \rho'(r)] \cdot \dfrac{w(s)}{\rho_A(s, r)}} & \text{if } \rho'(s) > \rho'(r) \end{cases} \quad (12)$$

In both formulas (11) and (12) the asymptotical value $\rho_A(s,r)$ can be approximated as:

$$\rho_A(s, r) = w(s) + \frac{w(s)}{w(s) + w(r) + \sum_{\substack{k \neq s,r \\ w(k) \leq \rho(k)}} w(k)} \cdot \sum_{k \neq s,r} \text{Max}\{0, w(k) - \rho(k)\} \quad (13)$$

On the basis of experimental results, formula (12) seems to provide the best accuracy, as is adopted in the presently preferred embodiment of the arrangement described herein. However, any other functional form satisfying the requirements listed above may be adopted without substantial modification. Similar expressions can be found for the weighting factor $\alpha_2(s,r)$.

In principle, the functional form of $\alpha_2(s,r)$ can be independent from the form chosen for $\alpha_1(s,r)$. However, the accuracy of the model can be improved if some dependency between the two set of weighting factors is introduced. A preferred solution is to determine $\alpha_2(s,r)$ according to formula (14) below:

$$\alpha_2(s, r) = \frac{1 - \alpha_1(r, s)}{1 - \alpha_1(r, s) \cdot \sum_{s=1}^{N} \alpha_1(s, r) \cdot \rho(s)} \quad (14)$$

This relationship generally expresses a sort of law of complementarity where the sum of $\alpha_1(s,r)$ and $\alpha_2(s,r)$ is a value between 1 and 2 which is a function of the load factor $\Sigma_1(r)$.

With this specific function the packet delay averaged over all the different classes appears to be independent of the values of the virtual loads (as it should be) at least for the simple case of two classes.

Formula (8) holds provided that $\Sigma_1(r)<1$. If this condition is not satisfied, then class r is affected by an overload condition and its packet delay is undefined. In practice, the overload condition will induce the loss of part of the transmitted traffic and the performance degradation can be measured in terms of percentage of lost traffic rather than in terms of packet delay. When this happens, the delay value $\gamma_{PA}(r)$ remains undefined and the loss probability for the congested class can be estimated with the approach described in the article by S. Borst, et al. cited in the introductory portion of the description. In practice $$P_{Loss}(r) = \frac{\rho(r) - w(r) \cdot R}{\rho(r)} \quad (15)$$

where:

$$R = \frac{1 - \sum_{j \in S} \rho(j)}{\sum_{j \in S} w(j)} \quad (16)$$

and S represents the set of non congested classes, i.e., those classes for which $\Sigma_1(r)<1$.

For non-congested classes, the maximum packet delay (i.e., the $\epsilon$-quantile of the delay distribution) can be estimated by assuming an exponential distribution. With this assumption we have:

$$\gamma_{PM}(r) = \gamma_{PA}(r) \cdot |\ln(s(r))| \quad (17)$$

Performance Evaluation for Elastic CoS

The performance of the elastic CoS is evaluated at the application level, in terms of average throughput available for the transmission of a data unit or, equivalently, in terms of average transmission time.

When observed at the application level, the queuing system appears to operate essentially like a processor sharing system: application level data units, indeed, are made up of several packets and appear to be served in parallel.

The article by Bonald, et al. cited in the introductory portion of the description provides an expression for the average throughput perceived by a generic flow of class r, derived under the assumption of absolute pre-emptive priorities and hyper-exponential distribution of the data unit size. This formula is reported here for the sake of clarity:

$$T_A(r) = \frac{\left(1 - \sum_{r-1}\right) \cdot \left(1 - \sum_r\right) \cdot \left(1 - \sum_r + A \cdot \rho(r)\right)}{\left(1 - \sum_r\right) \cdot \left(1 + (a + 1/a - 2) \cdot \sum_{r-1}\right) + A \cdot \rho(i)} \cdot M \quad (18)$$

where M is the link capacity, a is the parameter of the hyper-exponential distribution and:

$$A = \frac{a + 1/a - 1}{a + 1/a} \quad (19)$$

A hyper-exponential distribution with parameter a can be used for approximating a generic distribution with known first and second order moments. It is sufficient to choose for a the value that leads to a match in the second order moment of the generic distribution. In particular, for this application one may choose:

$$a = \frac{D_{L2}/D_L^2}{2} + \sqrt{\frac{(D_{L2}/D_L^2)^2}{4} - 1} \quad (20)$$

where $D_L$ and $D_{L2}$ are the average document size and the average squared document size, respectively.

This approach is valid provided that all the elastic CoS have the same characteristics in terms of average document size and average squared document size. If this assumption is not verified, then some additional approximations may be introduced by averaging the statistical characteristics of the document size over the different CoS.

The specific case of an exponential distribution is obtained by imposing a=1 and A=1/2.

Formula (18) can be generalized to extend its validity to the case of gradual priorities. The generalization introduced here follows the same approach described for the case of the real time CoS, and consists in substituting the terms $\Sigma_r$ and $\Sigma_{r-1}$ with the alternative terms $\Sigma_1(r)$ and $\Sigma_2(r)$ provided by formulas (9) and (10).

With this modification, the new expression for the average throughput becomes:

$$T_A(r) = \frac{\left(1 - \sum_2(r)\right) \cdot \left(1 - \sum_1(r)\right) \cdot \left(1 - \sum_1(r) + A \cdot \rho(r)\right)}{\left(1 - \sum_1(r)\right) \cdot \left(1 + (a + 1/a - 2) \cdot \sum_2(r)\right) + A \cdot \rho(i)} \cdot M \quad (21)$$

The average throughput $T_A(r)$ represents the average transmission speed experienced during the transmission of a data unit. The average transmission time of a data unit of given size can be determined thereby.

By taking the average document size $D_L(r)$, as a reference size, one obtains:

$$\gamma_{DA}(r) = \frac{D_L(r)}{T_A(r)} \quad (22)$$

Formula (21) applies provided that $\Sigma_1(r)<1$. Those CoS for which this condition is not satisfied are congested (unstable) and will experience a non-negligible loss of information. For these CoS the average throughput and the average transmission time are undefined and the performance level is measured in terms of traffic load probability, computed according to expression (15).

More in detail, the block 110 computes in a unit 111 the values of the loads ρ(r) offered by each CoS, and the values of the virtual loads ρ'(r).

The block 110 further processes in a unit 112 the list of the scheduler weights w(r) and generates a new set of weights w'(r) compatible with the presence of a CoS handled with strict priority.

In practice, it generates an artificial weight for the strict priority class and rearranges the remaining weights so that the normalization condition (1) is satisfied. From now on, the modified weights w'(r) will replace on the original weights w(r).

Two further units 113 and 114 compute the values of the parameters $\Sigma_1(r)$ and the values of the parameters $\Sigma_2(r)$. This occurs on the basis of the values w' (r), ρ(r) and ρ'(r) output from the units 111 and 112.

Additionally, the block 110 further checks (in a unit 115, based on the output of the unit 113) the stability of each CoS and stores the result of the test in the array $\text{Flag}_{Stab}(r)$.

Finally, a unit 116 computes the values of parameters a and A.

More in detail, the input data to the block 110 are the following.
- the number of CoS N
- the link capacity M
- the flag indicating the presence of the strict priority class $\text{Flag}_{SP}$
- the list of the scheduler's weights w(r)
- the list of the offered traffics B(r)
- the list of the average document sizes $D_L$ (r)
- the list of the average squared document sizes $D_{L2}(r)$ The output data are:
- the list of the offered loads ρ(r)
- the list of the modified weights w'(r)
- the list of the parameters $\Sigma_1(r)$
- the list of the parameters $\Sigma_2(r)$
- the list of the flags $\text{Flag}_{Stab}(r)$
- the values of parameters a and A As shown, the block 110 preferably includes six main (sub)blocks or units 111 to 116.

The unit 111 performs the computation of the values of the offered loads ρ(r) according to formula (2) and the computation of the values for the virtual loads ρ'(r) according to formula (3).

The unit 112 performs the computation of the modified weights w'(r). This computation depends on the value of $\text{Flag}_{SP}$, according to the following expression:

$$w(1) = \begin{cases} w(1) & \text{if } Flag_{SP} = \text{False} \\ 10 \cdot \frac{\rho(1)}{\text{Min}\{\rho'(r)\}} & \text{if } Flag_{SP} = \text{True} \end{cases} \quad (23a)$$

$$w(r) = \begin{cases} w(r) & \text{if } Flag_{SP} = \text{False} \\ \frac{w(r)}{\sum_{j=1}^{N} w(j)} & \text{if } Flag_{SP} = \text{True}_{for} \; 1 \leq r \leq N \end{cases} \quad (23b)$$

The unit 113 has the detailed architecture shown in FIG. 4. The unit 113 performs (in a module designated 113.2) the computation of parameters $\Sigma_1(r)$ according to formula (9). The weighting factors $\alpha_1(s,r)$ are computed (in a module 113.1) according to formula (12), using the asymptotic values $\rho_A(s,r)$ computed according to formula (13).

The unit 114 (having the detailed architecture shown in FIG. 5) performs in a module 114.3 the computation of parameters $\Sigma_2(r)$ according to formula (10). The weighting factors $\alpha_2(s,r)$ are computed according to formulas (14) in a module 114.2, on the basis of the auxiliary weights $\alpha_2(s,r)$ computed in a module 114.1 according to formula 12, using the asymptotic values $\rho_A(s,r)$ computed according to formula (13)

The unit 115 assigns the value to $\text{Flag}_{Stab}(r)$, depending on the value of $\Sigma_1(r)$:

$$Flag_{Stab}(r) = \begin{cases} \text{True} & \text{if } \sum_1 (r) < 1 \\ \text{False} & \text{if } \sum_1 (r) \geq 1 \end{cases} \quad (24)$$

The detailed architecture of the unit 116 is shown in FIG. 6. The unit 116 performs (in two modules 116.3 and 116.4, respectively) the computation of parameters a and A according to formulas (20) and (19), respectively, after having computed the reference value $D_L$ (average document size) in a module 116.1 and the reference value $D_{L2}$ (average squared document size) in a module 116.2. These reference values are computed by averaging the values characterizing the different CoS:

$$D_L = \sum_{r=1}^{N} \left( \frac{B(r)}{\sum_{j=1}^{N} B(j)/D_L(j)} \right) \quad (25)$$

$$D_{L2} = \sum_{r=1}^{N} \left( \frac{B(r)/D_L(r)}{\sum_{j=1}^{N} B(j)/D_L(j)} \cdot D_{L2}(r) \right) \quad (26)$$

The block 120 is devoted to the evaluation of the performances experienced by the different CoS. The block 120 (having the architecture shown in FIG. 7) includes three components, devoted to different aspects of performance evaluation.

A first component (module 120.1) evaluates the traffic loss probability $P_{Loss}(r)$ for the congested (unstable) CoS.

A second component (module 120.2) evaluates the average and maximum packet delay for the non congested (stable) Real time CoS.

A third component (module 120.3) evaluates the average throughput and the average transmission time for the non congested (stable) Elastic CoS.

Operation of the modules 120.1 to 120.3 is managed via three modules (that are in fact representative of logical steps) indicated as 120.4 to 120.6.

The module 120.4 scans the CoS list by varying r from 1 to N. The modules 120.5 and 120.6 test the flags $\text{Flag}_{stab}(r)$ and $\text{Flag}_n(r)$ for trueness in order to properly "steer" the procedure over the various alternatives represented by the modules 120.1 to 120.3.

Figure 8:
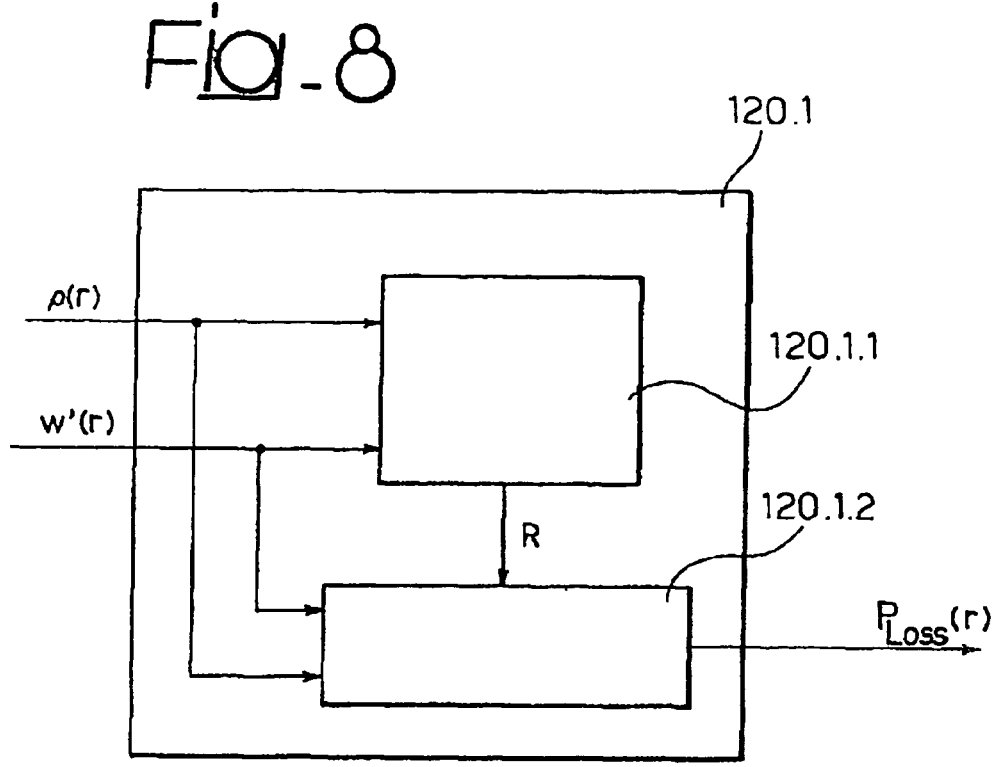

The architecture of the module 120.1 is shown in FIG. 8. This module receives as an input the offered loads ρ(r) and the modified scheduler's weights w'(r) and produces in output the values of the traffic loss probability for the unstable CoS r.

The traffic loss probability is computed according to formula (15) and (16) in two units designated 120.1.1 and 120.1.2, respectively.

Figure 9:
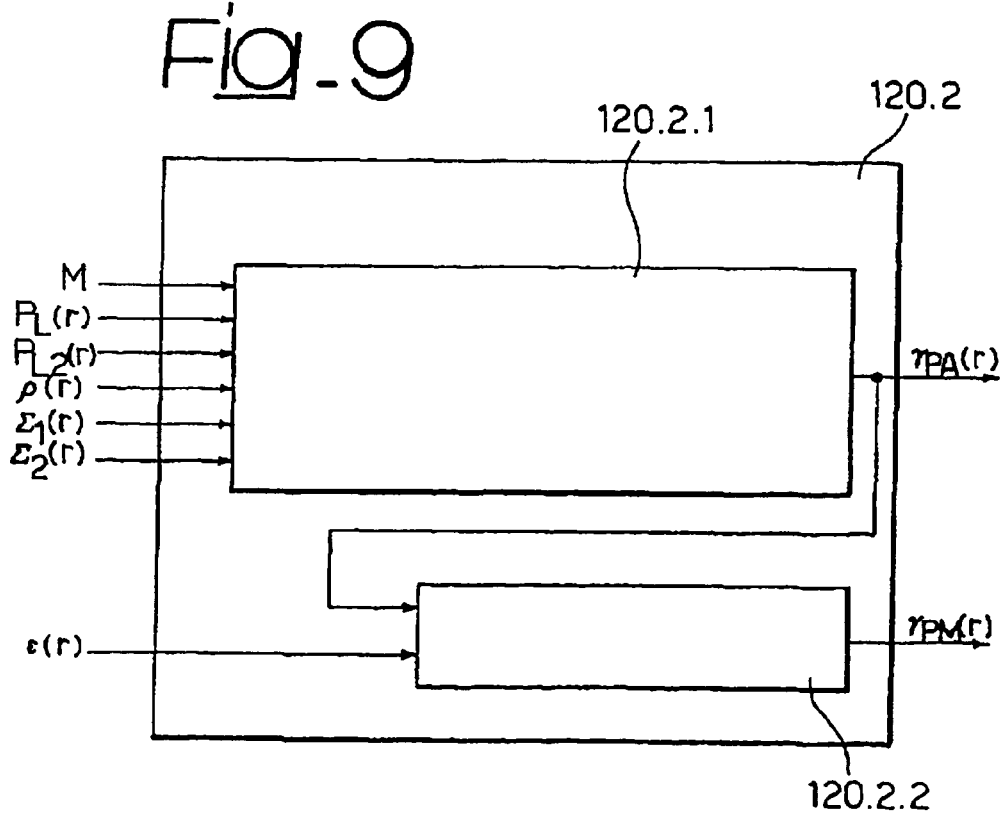

The architecture of the module 120.2 is shown in FIG. 9. The inputs to this module are:
- the value of the link capacity M
- the values of the average packet size $P_L(r)$
- the values of the average squared packet size $P_{L2}(r)$
- the values of the offered load $\rho(r)$
- the values of the parameters $\Sigma_1(r)$
- the values of the parameters $\Sigma_2(r)$
- the values of the thresholds $\epsilon(r)$.

The outputs from this module are:
- the value of the average packet delay $\gamma_{PA}(r)$ computed for the stable Real Time CoS r
- the value of the maximum packet delay $\gamma_{PM}(r)$ computed for the stable Real Time CoS r.

The average packet delay is computed according to the formula (8) in a unit 120.2.1; the maximum packet delay is computed according to the formula (17) in a module 120.2.2.

Figure 10:
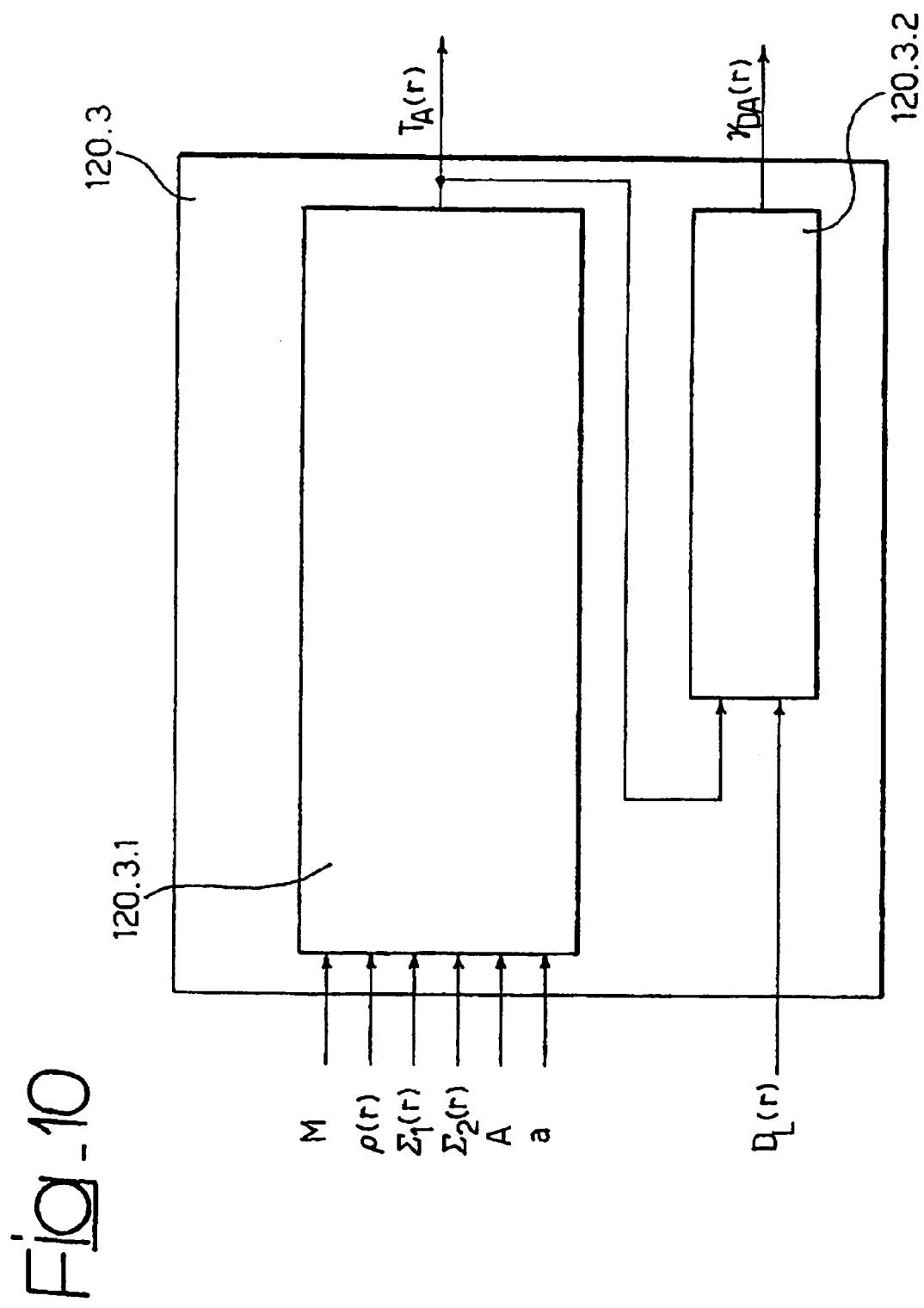

The architecture of the module 120.3 is shown in FIG. 10. The inputs to this module are:
- the value of the link capacity M
- the values of the offered load $\rho(r)$
- the values of the parameters $\Sigma_1(r)$
- the values of the parameters $\Sigma_2(r)$
- the values of the parameters $D_L(r)$
- the value of parameter A
- the value of parameter a.

The outputs from the module are:
- the value of the average throughput $T_A(r)$ computed for the stable Elastic CoS r;
- the value of the average transmission time $\gamma_{DA}(r)$ computed for the stable Elastic CoS r.

The average throughput is computed according to the formula (21) in a unit 120.3.1; the average transmission time is computed according to the formula (22) in a unit 120.3.2.

Experimental data demonstrate the improvement achieved by means of the arrangement described herein.

Specifically, in the experiments three CoS have been considered, namely:
- real time with highest priority (CoS1), and
- "elastic" with a higher and a lower priority level (CoS2 and CoS3, respectively).

The link capacity has been assumed to be M=1.544 kb/s and the global offered load ρ has been varied in the interval [0.7, 0.95]. The adopted scheduler weights have been the following: w(1)=0.7; w(2)=0.2; w(3)=0.1. With these assumptions the Real Time class (CoS 1) has the highest priority and CoS 2 has higher priority than CoS 3.

The observed performance parameters are the average packet delay experienced by the real time class (CoS 1) and the average transmission time experienced by the elastic classes (CoS 2 and CoS 3).

Table 1 below reproduces the basic parameters for the three CoS used in the experiments

| Cos | $P_L(r)$ | $P_{L2}(r)$ | $D_L(r)$ | $D_{L2}(r)$ | Flag$_{RT}$(r) | $\rho(r)$ |
|-----|----------|-------------|----------|-------------|----------------|-----------|
| 1   | 0.96 kb  | 1           |          |             | True           | 0.2 ρ     |
| 2   | 12.0 kb  | 1           | 400 kb   | 3           | False          | 0.4 ρ     |
| 3   | 12.0 kb  | 1           | 400 kb   | 3           | False          | 0.4 ρ     |

Performance of the elastic classes (CoS 2 and CoS 3) has been evaluated by means of a prior art algorithm, based on expression (18), as well as by means of the arrangement described herein, based on expression (21). Similarly, performance of the real time class has been evaluated by means of a prior art algorithm, based on expression (5), as well as by means of the arrangement described, based on expression (8).

The experimental results show an appreciable improvement of accuracy over the prior art for CoS 1 (real time, highest priority) and for CoS 2 (elastic, intermediate priority).

Only a marginal improvement was observed for CoS 3: this is not surprising since, with the set of scheduler weights selected, the level of service provided to the lowest priority class is very close to the level provided in an absolute priority system: for that lowest priority class the advantages of the arrangement described herein are thus less evident Consequently, without prejudice to the underlying principles of the invention, the details and the embodiments may vary, also appreciably, with reference to what has been described by way of example only, without departing from the scope of the invention as defined in the annexed claims.

The invention claimed is:

1. A method for performance evaluation in a network providing communication services by means of a generalized processor sharing packet scheduling discipline, said services comprising classes of services having relative priorities, the method being performed by a computer system comprising at least one processor and at least one non-transitory computer readable medium encoded with program instructions that, when executed, cause the system to perform the method, the method comprising the steps of:

evaluating, by the at least one processor, performance of a given class of services as a function of a load produced by other classes of services having a priority higher than or equal to said given class as well as of perturbation effect exerted on said given class by other classes having priority higher than said given class; and determining, by the at least one processor, said load and said perturbation effect as weighed sums of contributions of each of said other classes to said load and said perturbation effect.

2. The method of claim 1, comprising the step of selecting weighting factors of said weighed sums for said load and said perturbation effect as a function of the ratio of an offered load to an associated scheduler weight for respective ones of said other classes.

3. The method of claim 1, comprising the step of selecting the weighting factors of said weighed sums for said load and said perturbation effect as having, at least partly, one of an exponential and a hyperbolic expression.

4. The method of claim 1, comprising the step of selecting said respective weighting factors of said weighed sum for said load and homologous weighting factors of said weighed sum for said perturbation effect as having a functional dependency therebetween.

5. The method of claim 4, comprising the step of selecting said functional dependency as the sum of each said respective weighting factor of said weighed sum for said load and said homologous weighting factor of said weighed sum for said perturbation effect being a value of 1 to 2 which is a function of the load.

6. The method of claim 1, comprising the step of evaluating performance of said network in connection with services comprising classes of services having real time and non-real time requirements, respectively.

7. The method of claim 1, comprising the step of evaluating performance of said network in connection with services comprising at least one class of services having real time requirements, said performance being evaluated as an average packet delay experienced by said at least one given class of services having real time requirements.

8. The method of claim 1, comprising the step of evaluating performance of said network in connection with services comprising at least one given class of services having non real time requirements, said performance being evaluated as at least one of average throughput available for the transmission of a data unit over said network, an average transmission time, and a transmission speed of a data unit over said network for said at least one given class of services having non real time requirements.

9. The method of claim 8, comprising the step of evaluating performance of said at least one given class of services having non real time requirements as a function of the average throughput perceived by said given class under the assumption of hyper-exponential distribution of sizes of said data units.

10. The method of claim 9, comprising the step of selecting said hyper-exponential distribution as approximating a distribution with known first and second order moments.

11. The method of claim 9, comprising the step of selecting said hyper-exponential distribution as approximating a distribution with a known second order moment.

12. A system for evaluating performance of a network providing communication services by means of a generalized processor sharing packet scheduling discipline, said services comprising classes of services having relative priorities, comprising:
- a computer system comprising at least one processor and at least one non-transitory computer readable medium encoded with program instructions;
- a performance evaluation module configured for evaluating, using the at least one processor, performance of a given class of services as a function of a load produced by other classes of services having a priority higher than or equal to said given class as well as of perturbation effect exerted on said given class by other classes having priority higher than said given class; and
- a computation module configured for determining, using the at least one processor, said load and said perturbation effect as weighed sums of contributions of each of said other classes to said load and said perturbation effect.

13. The system of claim 12, wherein said computation module is configured for selecting weighting factors of said weighed sums for said load and said perturbation effect as a function a ratio of an offered load to an associated scheduler weight for respective ones of said other classes.

14. The system of claim 12, wherein said computation module is configured for selecting weighting factors of said weighed sums for said load and said perturbation effect as having, at least partly, one of an exponential and hyperbolic expression.

15. The system of claim 12, wherein said computation module is configured for selecting respective weighting factors of said weighed sum for said load and homologous weighting factors of said weighed sum for said perturbation effect as having a functional dependency therebetween.

16. The system of claim 15, wherein said computation module is configured for selecting said functional dependency as the sum of each said respective weighting factor of said weighed sum for said load and said homologous weighting factor of said weighed sum for said perturbation effect being a value of 1 to 2 which is a function of the load.

17. The system of claim 12, wherein said performance evaluation module is configured for evaluating performance of said network in connection with services including classes of services having real time and non-real time requirements, respectively.

18. The system of claim 12, wherein said performance evaluation module is configured for evaluating performance of said network in connection with services comprising at least one class of services having real time requirements, said performance being evaluated as the average packet delay experienced by said at least one given class of services having real time requirements.

19. The system of claim 12, wherein said performance evaluation module is configured for evaluating performance of said network in connection with services comprising at least one class of services having non real time requirements, said performance being evaluated as at least one of average throughput available for transmission of a data unit over said network, an average transmission time, and a transmission speed of a data unit over said network for said at least one given class of services having non real time requirements.

20. The system of claim 19, wherein said performance evaluation module is configured for evaluating performance of said at least one given class of services having non-real time requirements as a function of the average throughput perceived by said given class under the assumption of hyper-exponential distribution of sizes of said data units.

21. The system of claim 20, wherein said performance evaluation module is configured for selecting said hyper-exponential distribution as approximating a distribution with known first and second order moments.

22. The system of claim 20, wherein said performance evaluation module is configured for selecting said hyper-exponential distribution as approximating a distribution with a known second order moment.

23. A communication network comprising the system of claim 12, for evaluating performance of said network.

24. A non-transitory computer readable medium encoded with a computer program product loadable into a memory of at least one computer and comprising software code portions for performing the method of claim 1.

* * * * *